United States Patent [19]

Horstmann

[11] Patent Number: 4,480,272

[45] Date of Patent: Oct. 30, 1984

[54] SYSTEM OF RECORDING AND PLAYBACK OF DIGITALLY RECORDED SIGNALS, ESPECIALLY TELEVISION

[75] Inventor: Winfried Horstmann, Griesheim, Fed. Rep. of Germany

[73] Assignee: Robert Bosch GmbH, Stuttgart, Fed. Rep. of Germany

[21] Appl. No.: 363,442

[22] Filed: Mar. 30, 1982

[30] Foreign Application Priority Data

Apr. 9, 1981 [DE] Fed. Rep. of Germany ....... 3114273

[51] Int. Cl.$^3$ .......................... G11B 5/00; G11B 15/44
[52] U.S. Cl. ............................................. 360/8; 360/64
[58] Field of Search ................................ 360/8, 32, 64

[56] References Cited

U.S. PATENT DOCUMENTS 3,860,760 1/1975 Rittenback .............................. 360/8
4,206,476 6/1980 Hashimoro .............................. 360/8

Primary Examiner—Vincent P. Canney
Attorney, Agent, or Firm—Frishauf, Holtz, Goodman & Woodward

[57] ABSTRACT

Four magnetic heads are provided on a rotary mount equally spaced around the circumference, so when they are rotated to scan a tape wound around the headwheel in half a turn of a helix, each oblique track on the tape corresponds to half a revolution of the headwheel. In recording, the incoming signals are subdivided in time demultiplex into segments alternately distributed first to one diametryl pair of heads on the headwheel and then to the other diametryl pair, in each case through a digital time expander that doubles the time required to transmit the signal segment, thus reducing the bit rate by half. The reverse operations are done in playback, with time-expansion before the signal segments are put together into a continuous signal channel stream at the original bit rate. If the time-expansion is by just a little less than the factor of two, and the time-compression likewise, the places on the tape where two heads of the same channel would instantaneously both be in contact with the tape are left clear of signals, and disturbances are avoided, without interfering with the continuity of the playback signal.

5 Claims, 4 Drawing Figures

SYSTEM OF RECORDING AND PLAYBACK OF DIGITALLY RECORDED SIGNALS, ESPECIALLY TELEVISION

CROSS REFERENCE TO RELATED APPLICATION

Hubert Foerster et al, Ser. No. 353,824 filed 3/2/82 now U.S. Pat. No. 4,472,745 issued 9/18/84, claiming the priority of German application No. P 31 09 066.

This invention concerns a system for recording and reproducing digital signals, particularly digitally encoded video signals using a magnetic tape as the recording medium, in which the data stream to be recorded is subdivided by a time-demultiplex circuit, into at least two recording channels, after which the signal segments of these channels are expanded in time and are recorded in this manner on the magnetic tape. In reproduction the time-expanded signal segments, after corresponding time compression, are recombined by means of a time-multiplex circuit into a single channel signal stream.

Very high bit rates, up to the order of magnitude of 200 megabits per second must be handled on a magnetic tape for storing digitally coded broadband signals such as color television signals. By the choice of a suitable recording code the recording data density corresponds to a maximum frequency to be recorded of about 100 MHz. Known recording systems which at present are used to record analog color television signals permit the recording and reproduction of signals with an upper frequency limit of about 20 MHz. By changing various parameters of these existing systems the maximum bit rate per magnetic head can brought into the order of magnitude of about 90 to 100 Mbit/s. Since the relative velocity between the revolving magnetic transducer heads and the magnetic tape cannot be indefinitely raised, particularly for mechanical reasons, it has already been proposed to operate with two parallel bit streams in connection with an oblique track magnetic tape apparatus with a tape envelopment angle of 180 and four magnetic heads equally distributed around the periphery of a head wheel.

According to an earlier proposal disclosed in earlier-filed patent applications owned by the assignee of the present application, represented by U.S. patent application Ser. No. 353,824, filed Mar. 2, 1982 the digital signals are distributed to the magnetic heads in contact with the magnetic tape and the envelopment angle of the tape around the headwheel as well as a number of mangetic heads is so chosen that all the time a plurality of recording or reproducing heads are in contact with the magnetic tape. In this manner the incoming bit stream is subdivided among the individual channels by a demultiplex circuit and in playback are recombined by means of a multiplex circuit into a single channel signal.

THE INVENTION

It is an object of the present invention to provide a system of the kind above-described in which the distribution of the data stream in a plurality of channels is produced in a simpler manner and with simple means.

Briefly, the tape envelops the headwheel by such an angle that at least one magnetic head belonging to one recording channel remains in contact with the tape and the factor of time expansion is equal to the number of recording channels. In particular the heads are evenly distributed circumferentially of the headwheel and a pair of opposite heads are connected to operate for the same channel, in the case of 180° envelopment of the headwheel by the tape, which conveniently provides two channels.

The present invention has the advantage that the envelopment angle of the headwheel by the tape does not need to be increased, so that the length of the oblique tracks can advantageously be kept small.

THE DRAWINGS

The invention is further described by way of illustrative example with reference to the annexed drawings, in which:

FIG. 1 schematically shows a headwheel with four magnetic heads usable in the practice of the invention, enveloped by a magnetic tape over an angle of 180° or somewhat more;

DESCRIPTION OF THE ILLUSTRATED EMBODIMENTS

Figure 1:
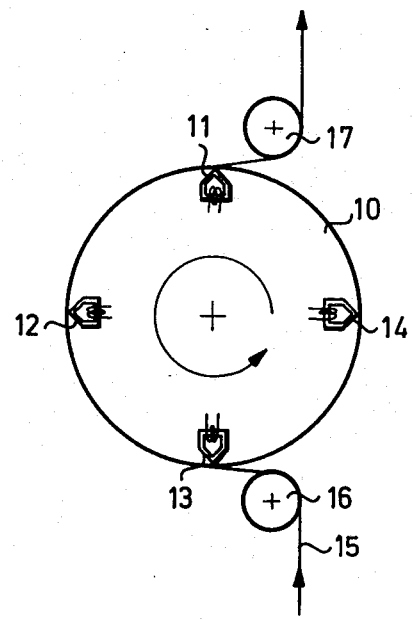

For simplicity, FIG. 1 shows only a revolving headwheel 10 with four magnetic heads 11, 12, 13 and 14 evenly distributed around the circumference. The magnetic tape 15 is supplied from a supply reel (not shown) and is guided over a direction-changing roller 16. The tape then envelops the headwheel in a half-winding of a helix, after which its direction is again changed by a second roller towards a take-up reel (not shown). During operation of the magnetic equipment, the tape 15 moves at relatively low velocity through various guiding devices and past the rapidly revolving headwheel, so that the magnetic heads 11, 12, 13 and 14 scan the tape 15 in an uninterrupted sequence of tracks running obliquely to the edge of the tape. Among the magnetic heads 11, 12, 13 and 14 on the headwheel 10 the connections of those that are diametrically opposite each other are preferably connected together at least during the recording process.

Figure 2:
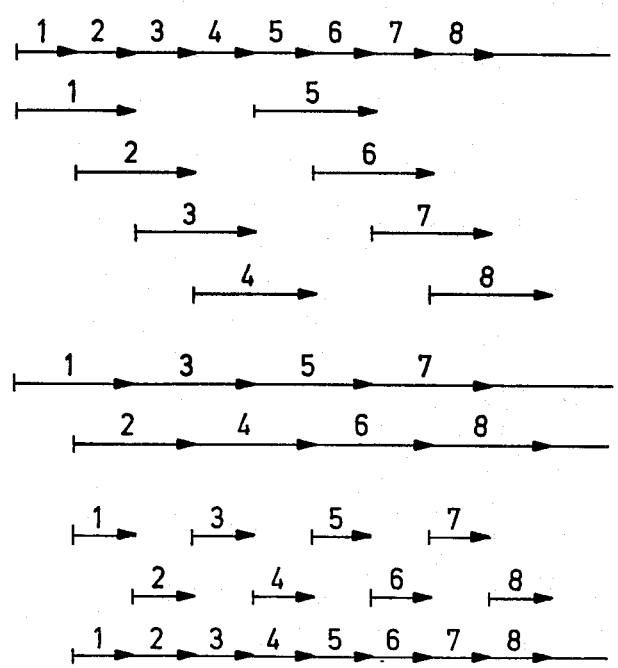
FIG. 2 shows the time relation of signal tracks provided by the repsective heads during recording and picked up in playback.

FIG. 2 shows the change of the data stream in recording and its change back into the original form in playback. This figure is a time diagram made up of various line groups designated a the right with the letters a, b, c ..., with the same time scale running horizontally. The incoming data stream contains series of information elements of which a number of successive ones are designated 1 to 8.

The duration in time of each information element corresponds to one quarter of a head revolution. In the illustrated example it may be assumed that the elements 1 to 8 each represent groups of television lines, of which a larger number would produce a complete color television picture. According to the nature of the invention, these are to be recorded in a plurality of channels in parallel for the purpose of lowering the bit rate necessary for recording. The designation "channel" herein, in accordance with the usual manner of speaking, means a recording or playback path pertaining to a particular magnetic head pair.

Lines b of FIG. 2 show the data segments (information elements) of line a after they have been subjected to a time-expansion process. In such a process their time base, which begins in every case at the beginning of the actual data segment, is so changed that each of the data segments 1 to 8 of line a now stretches over twice the original time duration. As shown, the data segment 1 spreads out over the time taken up by the original data segments 1 and 2. Data segment 2 of lines b likewise spreads over the time of the original data segments 2 and 3 on line a, and so on. By means of suitable switching arrangements the expanded signal segments 1 to 8 of lines b which overlap each other in time are combined into two completely occupied channels shown in lines c. As there shown the signal segments 1,3,5,7 . . . provide a continuous data stream in a first channel and the signal segments 2,4,6,8 . . . provide a continuous data stream in a second channel. As the result of the time expansion that takes place, the bit rates in the individual channels in the group of lines c is reduced by half. The two parallel data streams in the form shown in lines c of FIG. 2 can accordingly be recorded in two separate channels on the magnetic tape.

In reproduction the data stream of each channel is subjected to time compression which so changes the time base of the signal segments 1,3,5,7 and 2,1,6,8 that they regain their original length or duration in time. As the result of the nature of the time compression device, which necessarily can act only on signals that are already delivered to the time compression device, constant time base delay or shift is produced for all time-compressed signal sections compared to the original input segments of line a. The signal segments 1 to 8 present in two different channels can be reunited into a single data stream with disappearance of the regular gaps present after time compression, whereby the recombined data stream has the originally high bit rate, as shown in line e of FIG. 2. As already explained, the output data stream of line e corresponds to the stream of line a, with merely a constant time-base shift corresponding to the duration of one single segment.

Figure 3:
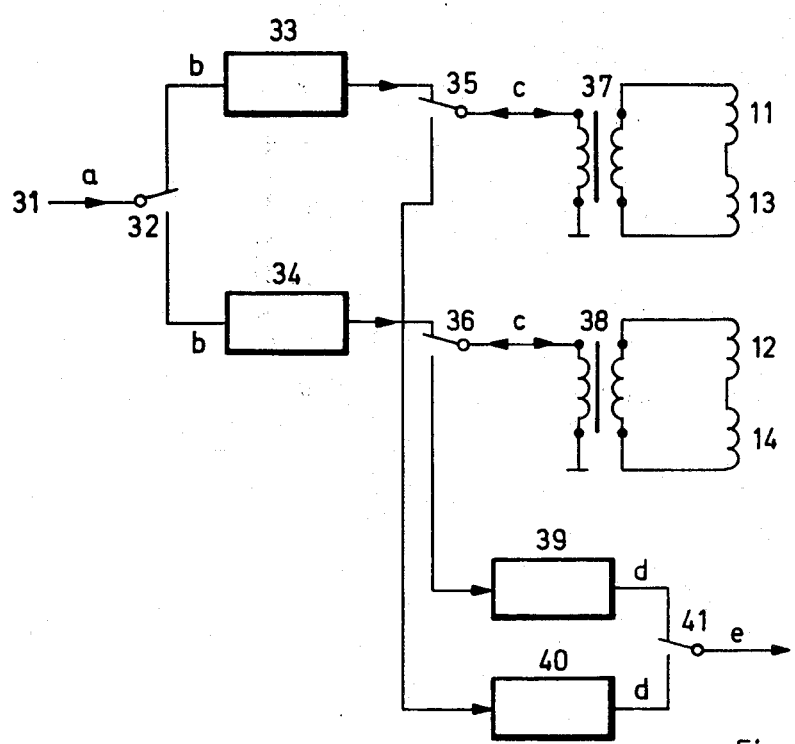
FIG. 3 is a diagram of a circuit for subdivision of the digital signals to be recorded and for their recombination in playback.

The diagram given in FIG. 3 shows an embodiment of a circuit for processing digitally coded signals in a manner corresponding to the process steps illustrated in FIG. 2. The reference numerals used in FIGS. 1 and 2 and the letters designating the line groups of FIG. 2 appear at the appropriate places in FIG. 3 and designate the same apparatus or signals as in the other figures, as the case may be. The data stream on the input line 31 may be regarded as composed of individual signal segments, as indicated in line a of FIG. 2. The switch 32 distributes the incoming data stream at a rate corresponding to the length of signal segments that is desired to the two time-expansion circuits 33 and 34 in which they are stretched to double their original time duration. These time-expansion circuits can for example be digital signal storage devices having different write-in and read-out rates. If in such a signal storage device a signal segment is written in at a certain clock rate and then read out at a clock rate that is smaller by half than the write-in rate, the read-out process lasts twice as long as the writing in: the original signal is hence expanded in time.

In the illustrated example, the switch 32 assigns the signal segments 2,3,5 and 7 to the time-expansion circuit 33 and the signal segments 2,4,6 and 8 to the time-expansion circuit 34. By the choice of suitable writing-in and reading-out rates, the time base is brought to double the original duration. In consequence, there is provided at the output of the time-expansion circuit 33 an uninterrupted data stream consisting of signal segments 1,3,5,7 . . . and at the output of the time-expansion circuit 34 a data stream composed of the signal segments 2,4,6,8 . . . in time-expanded form, corresponding to lines c of FIG. 2.

The switches 35 and 36 have the position shown in FIG. 3 during recording so that the data stream of one channel is supplied through a first broadband transmission device, shown as a transformer, to the signal coils of the magnetic heads 11 and 13 (see FIG. 1), and the data stream of the second channel is lead through a second broadband transmission circuit 38 to the signal coils of the magnetic heads 12 and 14.

As the result of the envelopment of the headwheel 10 by the magnetic tape extending over at least 180° of the headwheel, at least one magnetic head of each pair connected together is in contact with the magnetic tape. Consequently, a gapless recording of both data streams represented in lines c of FIG. 2 is made possible, while the bit rate is reduced by half compared to that of the incoming data stream.

In playback, the previously recorded tracks are scanned by a new passage of the magnetic tape 15 past the headwheel and its magnetic heads. At this time, the switches 35 and 36 connect the magnetic heads 11,12,13,14 to the circuits 39 and 40 described later for processing of the signals picked up from the tracks recorded on the tape. The circuit arrangements for switching the magnetic tape equipment from recording to playback, the devices for rotating the headwheel and for transport of the magnetic tape, as well as for amplifying the signals, correspond fully to those devices and circuits present in already known apparatus, so that their representation in the scope of the description of the present invention is not necessary. The tracks scanned by the magnetic heads 11,12,13 and 14 contain magnetization patterns, which after conversion in to electrical signals, correspond to the signals that were recorded and therefore are present in two channels, in one of which are the signal segments 1,3,5,7 . . . and in the other pick-up channel the signal segments 2,4,6,8 . . . The circuits 39 and 40 are time-compression circuits in which the signal segments 1,3,5,7 . . . of one channel and the signal segments 2,4,6,8 . . . of the other channel are brought back down to their original length in time which they possessed before time-expansion preparatory to recording. The time-compression circuits 39 and 40 can correspond closely in their construction to the time-expansion circuits 33 and 34, with the time base change of the signal segments running through them being produced again by the selection of suitable clock rates for writing-in and reading-out. The switch 41 is switched back and forth in such a way corresponding to the time periods of the outputs alternately presented by the time-compression circuits 39,40, as illustrated in lines d of FIG. 2, that at the output of the entire circuit a continuous data train corresponding to line e of FIG. 2 is present, as indicated to the right of the switch 41.

The data train or stream provided as an output in FIG. 3 corresponds fully to the original signal corresponding to line a of FIG. 2 that was the input signal for recording, but there appears in playback as the result of the time-compression process, a constant basic delay corresponding to the length of one signal segment. With an envelopment of the headwheel or drum extending just over 180°, during a transition time there are always two heads belonging to the same channel simultaneously in contact with the tape.

In a circuit according to FIG. 3, the thereby determined disturbance zone can be avoided by a transformation factor less than 2: the signal segments to be transformed having the duration of a quarter head revolution are then expanded only to a length that is at most a headwheel half revolution less the overlap time. The overlap time can then be made to occur in a brief period that is free of recording.

Figure 4:
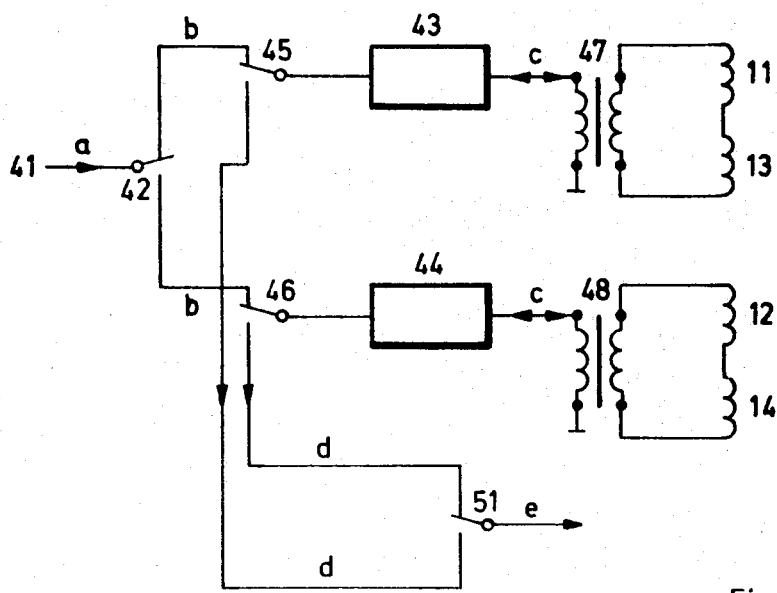
FIG. 4 is a diagram of another form of subdivision and recombination circuit.

In the circuit according to FIG. 4, the data stream entering at 41 is distributed by the switch 42 between the two time-expansion circuits 43 and 44, the duration of the selected signal segments determining the switching frequency. During recording, the switches 45 and 46 remain in the position illustrated in the drawing, so that the storage units 43 and 44 are continuously connected to the switch 42. By suitable choice of the read-out clock rate, the time-expansion of the signal segments written into the storage units 43 and 44 takes place as in the circuits of FIG. 3. The signals proceed through the broadband transformer 46 from the storage unit 43 to the signal coils of the magnetic heads 11 and 13 and from the storage unit 44 through the broadband transformer 48 to the signal coils of the magnet heads 12 and 14.

In playback, the switches 45 and 46 move over to the position which is not the one shown in the drawing, so that the signal coils of the magnetic heads are connected with their playback channel through the broadband transformers 46 and 48 and the storage units 43 and 44. The switch 51 in the playback circuit puts together the incoming time-compressed signal segments spaced apart by gaps of the same length to produce a continuously flowing data stream corresponding to line e of FIG. 2. FIG. 4 differs from FIG. 3 in that the storage units 43 and 44 are used both for time-expansion in recording and time-compression in playback.

Although the invention has been described with respect to particular illustrative embodiments, it will be understood that variations and modifications are possible within the inventive concept.

It is noted that it is not necessary for the switching rate of switches 32, 41, 45 and 51 to be such as to deal with signal segments of a time duration measured for recording on, or playback from, exactly one track on the tape, or exactly one television, line, although either of these criteria may be convenient for determination of this switching rate in particular cases.

I claim:

1. A magnetic-tape recorder-playback apparatus for broadband digital signals having a plurality of diametral pairs of magnetic recording and playback heads mounted for obliquely scanning an advancing tape enveloping said headwheel by at least a half-turn of a helix for recording or pickup onto or from oblique tracks on said tape, said apparatus further comrising:

a headwheel carrying said plurality of diametral pairs of magnetic recording and playback heads in such a disposition that said heads are equally spaced around the circumference of said headwheel, and means for revolving said headwheel;

means for connecting the heads of each diametral pair of said heads to a common recording-and-playback channel;

means for guiding said tape to envelop said headwheel just enough to allow two heads of a diametral pair to touch the tape simultaneously twice per revolution;

first switching means for connecting each of said common recording-and-playback channels selectively to a corresponding recording channel and to a corresponding playback channel and at the same time making the apparatus ready for recording operation or playback operation according to whether said recording channel or said playback channel is connected;

time-base-changing means for each of said recording channels and playback channels for producing time-base expansion before recording and time-base compression after playback, in each case by a predetermined factor approximately equal to but not greater than the number of pairs of heads on said headwheel, said time-base-changing means including a digital signal storage unit for each of said recording channels, and write-in and read-out timing means, said first switching means being connected so as to cause said storage units to provide time-base expansion of signals in recording operation and time-base compression in playback operation, the write-in and read-out rates of said write-in and read-out timing means being determined so as to provide time-base expansion and compression factors just sufficiently less than the number of said pairs of heads, for preventing recording and playback while two heads of a diametral pair are in contact with the tape, and second switching means for connecting the several recording channels respectively connected in recording operation to said head pairs cyclically to a signal input so as to distribute input signals for time-base expansion in said channels and for connecting the several playback channels respectively connected in playback operation to said head pairs cyclically to a signal output so as to sequence time-base-compressed signals of said channels to produce a combined flow of signals without overlaps or gaps at said output.

2. Apparatus as defined in claim 1, in which there are two pairs of recording-and-playback heads on said headwheel.

3. Apparatus as defined in claim 1, in which said digital storage units of said time-base-changing means comprise a separate digital signal storage unit for each of said recording channels and a separate digital signal storage unit for each of said playback channels.

4. A method or recording broadband digital signals on a magnetic tape by means of a plurality of diametral pairs of magnetic recording heads mounted on a revolving headwheel which is enveloped by at least a half-turn of a helix of the tape as the tape is advanced, so as to produce oblique recording tracks on the tape, comprising the steps of:

distrubuting digital signals in signal sequence segments of a predetermined duration cyclically to a plurality of recording channels equal in number to the number of pairs of heads on said headwheel, said channels being respectively terminated by said heads of said pairs, said heads being mounted at equal spacings around the circumference of said headwheel;

time-base expanding said signal segments in said channels by a factor approximately equal to, but not greater than, the number of said channels and recording the time-expanded signals of each channels on said tape by means of a different diametral pair of said recording heads to produce recording tracks on said tape that overlap each other in recording time in the same proportion from one track to the next by virtue of equal spacing of said head around the circumference of said headwheel, and recording the signals of said channels on said tape while said tape envelops said headwheel by just enough more than a half-turn of a helix for two heads of a diametral pair to touch the tape simultaneously twice per revolution, said time-expansion step being performed with a time-expansion factor just sufficiently less than the number of said pairs of heads for preventing recording and playback while two heads of a pair are in contact with the tape.

5. Method as defined in claim 4, in which there are two pairs of recording heads, and in which said signal segments are distributed cyclically between two recording channels.

* * * * *